United States Patent
Howard et al.

(10) Patent No.: US 10,473,535 B2
(45) Date of Patent: Nov. 12, 2019

(54) METHODS AND SYSTEMS FOR NON-CONTACT MAGNETOSTRICTIVE SENSOR RUNOUT COMPENSATION

(71) Applicant: General Electric Company, Schenectady, NY (US)

(72) Inventors: Brian Howard, Reno, NV (US); Dan Tho Lu, Minden, NV (US); Lysle Turnbeaugh, Gardnerville, NV (US); David Erik Folkner, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 157 days.

(21) Appl. No.: 15/418,234

(22) Filed: Jan. 27, 2017

(65) Prior Publication Data

US 2018/0217011 A1 Aug. 2, 2018

(51) Int. Cl.
*G01L 1/12* (2006.01)
*G01L 1/26* (2006.01)
*G01L 3/10* (2006.01)

(52) U.S. Cl.
CPC ............... *G01L 1/125* (2013.01); *G01L 1/26* (2013.01); *G01L 3/102* (2013.01)

(58) Field of Classification Search
CPC . G01L 1/125; G01L 1/12; G01L 3/102; G01L 3/101; G01L 3/10; G01L 1/127; G01L 3/105
See application file for complete search history.

(56) References Cited

U.S. PATENT DOCUMENTS

| | | | |
|---|---|---|---|
| 4,803,885 A * | 2/1989 | Nonomura | G01L 3/102 73/862.333 |
| 5,029,118 A | 7/1991 | Nakajima et al. | |
| 7,996,142 B2 | 8/2011 | Sihler et al. | |
| 9,217,682 B2 | 12/2015 | Brummel et al. | |
| 2009/0025488 A1* | 1/2009 | Sihler | G01L 3/102 73/862.333 |
| 2014/0165737 A1* | 6/2014 | Brummel | G01M 13/025 73/779 |
| 2014/0366637 A1 | 12/2014 | Brummel et al. | |

FOREIGN PATENT DOCUMENTS

EP 0 757 236 A2 2/1997

OTHER PUBLICATIONS

International Search Report and Written Opinion issued in connection with corresponding PCT Application No. PCT/US2017/067960 dated Mar. 28, 2018.

\* cited by examiner

*Primary Examiner* — Leslie J Evanisko
*Assistant Examiner* — Leo T Hinze
(74) *Attorney, Agent, or Firm* — Mintz Levin Cohn Ferris Glovsky and Popeo, P.C.

(57) ABSTRACT

A stress sensing system for measuring stress in a conductive target material includes at least one sensor positioned proximate to the conductive target material. The sensor is configured to measure stress in the conductive target material and to transmit a signal indicative of the measured stress to a controller. The controller is coupled in communication with the sensor. The controller is configured to receive the signal from the sensor, determine a runout portion of the signal corresponding to the runout of the conductive target material, determine a runout pattern waveform from the runout portion, and subtract the runout pattern waveform from the signal.

12 Claims, 9 Drawing Sheets

METHODS AND SYSTEMS FOR NON-CONTACT MAGNETOSTRICTIVE SENSOR RUNOUT COMPENSATION

BACKGROUND

Conductive materials have magnetostrictive properties that cause the materials to change shape in the presence of an applied magnetic field. The inverse is also true. When a force is applied to a conductive material, the magnetic properties, such as magnetic permeability, of the material change. A magnetostrictive sensor may sense the changes in magnetic permeability and, because the changes are proportional to the amount of stresses applied to the conductive material, the resulting measurement may be used to calculate the amount of stress.

Stationary magnetostrictive sensors proximate to a moving conductive material, such as a rotating shaft, sense the magnetic permeability of an air gap defined between the magnetostrictive sensor and the conductive material (e.g., mechanical vibration) and variation in the conductive material properties (e.g., runout) as well as the permeability of the conductive target. The changes in the magnetic permeability as a result of stress being applied to the conductive material, however, may be small compared to the mechanical vibration and runout of the conductive material, making accurate measurement of stress in the conductive material difficult. In some instances, the runout and/or mechanical vibration result in signal noise that may have amplitudes greater than that of the stress signal, thereby completely obscuring the stress signal.

SUMMARY

The subject matter described herein relates generally to stress sensing in conductive materials, and more particularly, to methods and systems for reducing runout and/or mechanical noise in torque signals attributable to runout and mechanical vibration.

In one aspect, a stress sensing system for measuring stress in a conductive target material is provided. The stress sensing system includes at least one sensor positioned proximate to the conductive target material. The sensor is configured to measure stress in the conductive target material and to transmit at least one signal indicative of the measured stress. The system also includes at least one controller coupled in communication with the sensor. The controller is configured to receive the stress signal from the sensor, determine a runout portion of the stress signal corresponding to runout of the conductive target material, determine a runout pattern waveform from the runout portion, and subtract the runout pattern waveform from the stress signal.

In another aspect, a computer-implemented method for reducing runout and vibration noise from a stress sensing system is provided. The method includes receiving at least one signal from at least one stress sensor. The signal is indicative of stress in a conductive target material. In addition, the method includes determining a runout portion of the signal corresponding to runout of the conductive target material. Moreover, the method includes determining a runout pattern waveform from the runout portion, and subtracting the runout pattern waveform from the stress signal.

In yet another aspect, a non-transitory computer readable medium that includes computer executable instructions for reducing runout and vibration noise from a stress sensing system is provided. The stress sensing system includes a computing device, wherein when executed by the computing device, the computer executable instructions cause the computing device to receive at least one signal from at least one stress sensor. The signal is indicative of stress in a conductive target material. The computer executable instructions cause the computing device to determine a runout portion of the signal that corresponds to runout of the conductive target material, and determine a runout pattern waveform from the runout portion of the signal. Furthermore, the computer executable instructions cause the computing device to subtract the runout pattern waveform from the signal.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
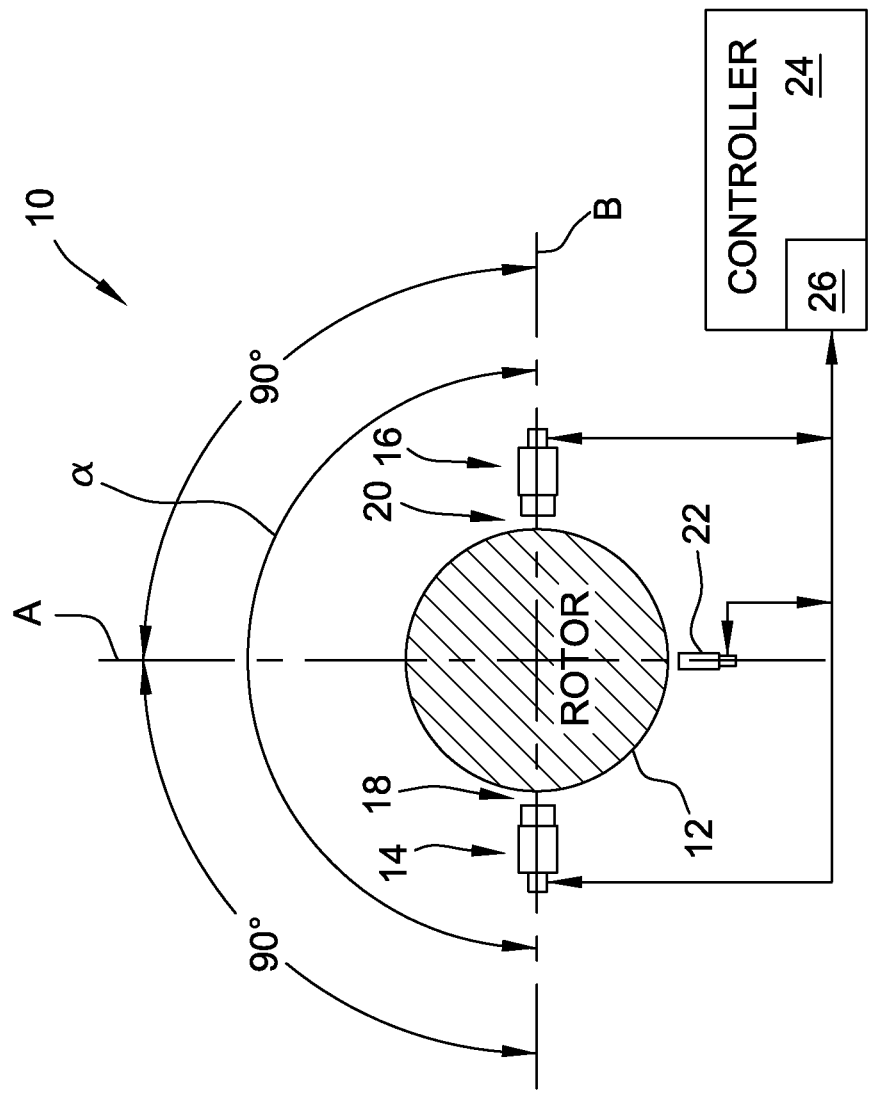
FIG. 1 is a schematic view of an exemplary stress sensing system for sensing stresses induced in a conductive target material.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations are identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, the phrase "magnetic permeability" includes the relative increase or decrease in the magnetic flux inside a material compared with the magnetic field in which the material is located.

The term "runout," as used herein, includes a condition in which varying material conditions (e.g., surface imperfections, localized stresses, etc.) cause a change to a stress signal that is not related to actual stress in the material.

As used herein, the terms "processor", "computer", and "controller", and related phrases, e.g., "processing device" and "computing device" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Furthermore, as used herein, the term "real-time" includes at least one of the times of occurrence of the associated events, the time of measurement and collection of predetermined data, the time to process the data, and the time of a system response to the events and the environment. In the embodiments described herein, these activities and events occur substantially instantaneously.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The present disclosure provides techniques that may be used with torque sensors to decrease and/or remove runout and mechanical vibration signals that are not related to torque of a rotating shaft. In particular, embodiments in the disclosure may be used to determine a runout signal pattern and removing it from the torque signal received from the torque sensor. In addition, the disclosure provides embodiments that can be used to combine the runout compensated torque signals from two or more torque sensors to correct for mechanical vibration of the shaft. Torque sensors typically sense the magnetic permeability of an air gap defined between the torque sensor and the rotating shaft and material property variations. In one embodiment, the techniques described include monitoring a rotational speed of the shaft and receiving a torque sensor signal corresponding to a zero stress condition of the shaft (i.e., when the shaft is rotating with no load). In other embodiments, the techniques described may include monitoring a rotational speed of the shaft already subject to stress and receiving a torque sensor signal corresponding to the shaft stress. The signal received from the torque sensor may facilitate the identification of a shaft runout pattern. The identified shaft runout pattern can then be removed from the subsequent torque signal received from the torque sensor. Removing runout and vibration signals from the torque signal can help improve accuracy in determining torque of the shaft. Other embodiments are within the scope of the disclosure.

FIG. 1 is a schematic view of an exemplary stress sensing system 10 for sensing stresses induced in a conductive target material 12. In the exemplary embodiment, stress sensing system 10 includes a conductive target material 12, a first sensor head, generally indicated at 14, and a second sensor head, generally indicated at 16. Alternatively, stress sensing system 10 can include more than two sensor heads. In the exemplary embodiment, conductive target material 12 can be, for example, and without limitation, a rotatable shaft or rotor. First sensor head 14 and second sensor head 16 can include, for example, and without limitation, stress sensors, and in particular, magnetostrictive torque sensors. In such an embodiment, stress sensing system 10 can be a torque sensing system. Alternatively, stress sensing system 10 can be any type of stress sensing system that is capable of sensing stress in any type of conductive target material. In the exemplary embodiment, first sensor head 14 can be positioned proximate to rotatable shaft 12 such that an air gap 18 is defined between sensor head 14 and rotatable shaft 12. In addition, second sensor head 16 can be positioned proximate to rotatable shaft 12 such that an air gap 20 is defined between sensor head 16 and rotatable shaft 12. Stress sensing system 10 also includes at least one speed sensor 22 for sensing rotation of rotatable shaft 12. Speed sensor 22 can include, for example, and without limitation, a Keyphasor®, tachometer, or other once-per-turn or multiple-events-per revolution reference. A Keyphasor may include, for example, a proximity switch used to identify the beginning and completion of each revolution of rotatable shaft 12. First and second sensor heads 14 and 16 and speed sensor 22 can be coupled to a controller 24 that includes a power supply component 26 for supplying the electrical current necessary to generate a magnetic flux used for sensing stress in rotatable shaft 12.

In some alternative embodiments, additional sensors (not shown), for example, and without limitation, proximity, magnetic field, and/or temperature, may be positioned proximate to rotatable shaft 12. Proximity sensors may be used to monitor air gaps 18 and 20 defined between rotatable shaft 12 and sensor heads 14 and 16, respectively. Magnetometers may be used to monitor background magnetic fields, for example, and without limitation, the earth's magnetic field and extraneous electromagnetic interference (EMI). In addition, temperature sensors may be used to monitor temperature changes, including ambient environment, first and second sensor heads 14 and 16, and/or rotatable shaft 12. Gap changes in air gaps 18 and 20, background EMI, and/or temperature changes may affect the data signal received by one or more detection coils (not shown) of first and second sensor heads 14 and 16. By monitoring air gaps 18 and 20, temperature changes, and background EMI, a magnitude of the assorted effects may be substantially reduced by controller 24.

In the exemplary embodiment, power supply component 26 can include, for example, and without limitation, at least one of a battery, a wireless power supply device, and/or a wired power supply device. In one alternative embodiment, a battery can transmit power to sensor heads 14 and 16, and speed sensor 22 through controller 24. In another alternative embodiment, a wireless power supply device can include any power source that enables operation of stress sensing system 10 as described herein, such as, but without limitation, an inductive power supply. The wireless power supply device can be located separately from sensor heads 14 and 16, and speed sensor 22. Alternatively, the wireless power supply device may be positioned in any location that enables stress sensing system 10 to function as described herein. Moreover, in another alternative embodiment, the wired power supply device can be configured to transmit power directly to sensor heads 14 and 16, and speed sensor 22 via one or more power cables (not shown). Furthermore, in other alternative embodiments, the wireless and wired power supply devices may include a battery that may be used to transmit power to stress sensing system 10 during a power failure. In such alternative embodiments, during normal operation of stress sensing system 10, the battery may be in a stand-by mode.

As shown in FIG. 1, in the exemplary embodiment, rotatable shaft 12 includes an axis system including a vertical axis "A" and a horizontal axis "B." First sensor head 14 and second sensor head 16 are positioned apart from each other at a predetermined radial angle $\alpha$. In the exemplary embodiment, radial angle $\alpha$ is 180°, defined by first sensor head 14 and second sensor head 16 being disposed on axis "B" on opposite sides of rotatable shaft 12. Alternatively, radial angle $\alpha$ can be any predetermined angle greater than 0° and less than 360°. Furthermore, as described above, stress sensing system 10 can include more than two sensor heads. In such an embodiment, each sensor head can be spaced from an adjacent sensor head by a predetermined radial angle greater than 0° and less than 360°. For example, and without limitation, in one alternative embodiment, stress sensing system 10 can include four sensor heads spaced equidistant about rotatable shaft 12 at 90° angles. In the exemplary embodiment, speed sensor 22 is positioned on axis "A," substantially equidistant from first sensor head 14 and second sensor head 16. Alternatively, speed sensor 22 can be positioned at any location about rotatable shaft 12 that enables stress sensing system 10 to function as described herein.

Figure 2:
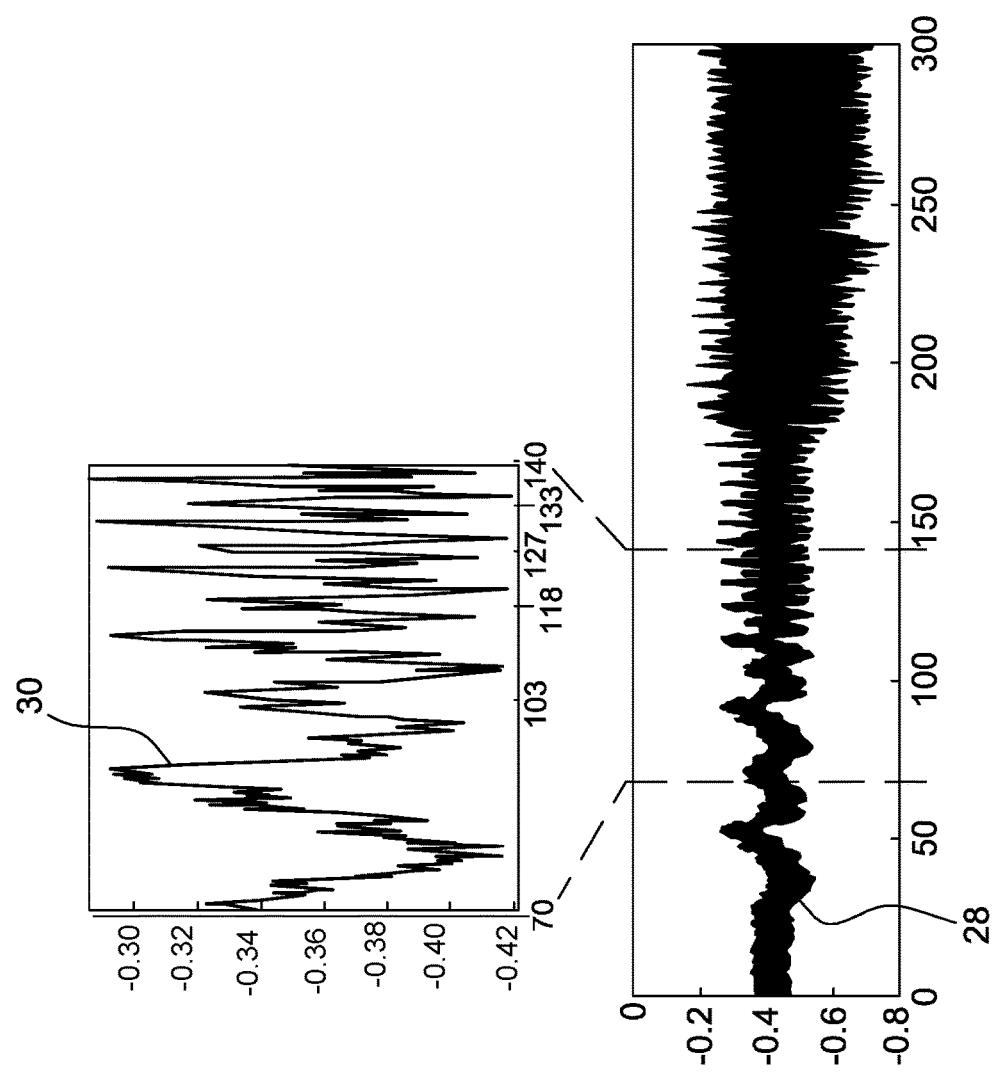
FIG. 2 is a schematic plot of an exemplary torque signal received by controller from a sensor head of the stress sensing system shown in FIG. 1.

FIG. 2 is a schematic plot of an exemplary torque signal 28 received by controller 24 from a sensor head, such as sensor head 14 or 16 (shown in FIG. 1), over a period of time, i.e., in the time domain. While the data signals and plots described herein are described in relation to the time domain, it is noted that the operations described can be equally applied in the frequency domain. In the exemplary embodiment, as described above, stress sensing system 10 monitors a rotation speed of the rotatable shaft 12 (shown in FIG. 1) while receiving torque signal 28. Speed sensor 22 provides a rotation signal (not shown) to controller 24 (shown in FIG. 1), such as a voltage spike that exceeds a predetermined threshold value, during each rotation of rotatable shaft 12. In one embodiment, the shaft speed can be assumed to be constant between each threshold spike of the rotation signal, and as such, an angular position of rotatable shaft 12 can be estimated as a function of the period between each threshold spike using a linear interpolation technique. As described herein, a portion of torque signal 28, generally indicated at 30, corresponding to a zero stress condition of rotatable shaft 12 (i.e., when the shaft is rotating with no load) can be used to isolate a synchronous runout signal 30 (shown in FIG. 3). As shown in the enlarged portion of the plot, torque signal portion 30 is shown in evenly spaced time intervals as a rotation speed of rotatable shaft 12 is increased. As such, spacing between peaks of torque signal portion 30 narrows as the rotation speed increases. The regularity of the runout of rotatable shaft 12 can be difficult to determine from torque signal portion 30 in such a time domain.

As shown in FIG. 2, torque signal 28 has an output value that cycles generally between about −0.2 output units and about −0.06 output units during a period between about 0 time units and about 175 time units. In one embodiment, the output units may include, for example, and without limitation, volts, and the time units may include for example, and without limitation, seconds. Alternatively, the output units may include any type of output unit output by sensor heads 14 and 16. In addition, the time units may include any time unit that enables stress sensing system 10 to function as described herein. In the exemplary embodiment, at about 175 time units, the output value range of torque signal 28 increases. In the exemplary embodiment, the period between about 0 time units and about 175 time units corresponds to a zero stress condition of rotatable shaft 12. In some embodiments, additional data received from other sensors and/or secondary measures, for example, and without limitation, output of a generator coupled to rotatable shaft 12, can be used to confirm and/or verify a zero stress condition of rotatable shaft 12. In the exemplary embodiment, the output values of torque signal 28 between about 0 time units and about 175 time units is indicative of runout and/or mechanical vibration of rotatable shaft 12, for example, and without limitation, due to rotatable shaft 12 imperfections. In the exemplary embodiment, torque signal 28 can be collected or received by controller 24 on a time basis.

However, torque signal 28 needs to be converted to a synchronous torque signal with respect to an angular position of rotatable shaft 12.

Figure 3:
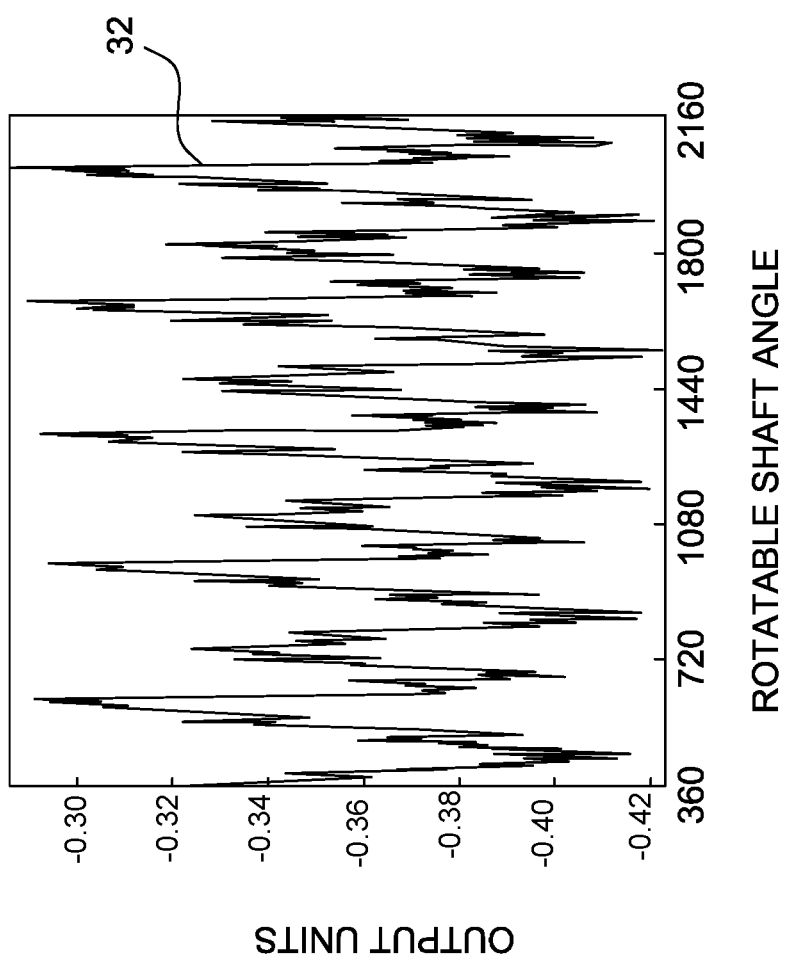
FIG. 3 is a schematic plot of an exemplary synchronous runout torque signal portion after resampling of a portion of the torque signal shown in FIG. 2.

FIG. 3 is a schematic plot of exemplary synchronous runout torque signal portion 32 after resampling of torque signal portion 30 (shown in FIG. 2) to an angle domain corresponding to rotatable shaft 12 (shown in FIG. 1) by controller 24 (shown in FIG. 1). In the exemplary embodiment, torque signal portion 28 corresponding to a zero stress condition of rotatable shaft 12 can be used by controller 24 to determine synchronous runout torque signal portion 32. For example, and without limitation, torque signal portion 30 corresponds to a period between about 70 time units and about 140 time units, as shown in FIG. 2. In an alternative embodiment, any portion of torque signal 28, including portions that do not correspond to a zero stress condition of rotatable shaft 12, may be used by controller 24. In the exemplary embodiment, runout of rotatable shaft 12 is typically fixed with respect to an angular positioned of rotatable shaft 12. Torque signal portion 30, however, can be collected or received by controller 24 on a time basis, which is referred to herein as asynchronous with respect to an angular position of rotatable shaft 12. As such, torque signal portion 30 can be converted by controller 24 to synchronous torque runout signal 32 with respect to an angular position of rotatable shaft 12. This facilitates averaging synchronous torque runout signal 32 with corresponding data signals (not shown) received by additional sensor heads, such as sensor heads 14 and 16 (shown in FIG. 1). In the exemplary embodiment, synchronous torque runout signal 32 corresponds to five revolutions of rotatable shaft 12. Alternatively, fewer or greater than five revolutions of rotatable shaft 12 may be used to determine synchronous torque runout signal 32. As shown in FIG. 3, spacing between peaks of synchronous torque runout signal 32 are generally evenly spaced. As such, the regularity of the runout pattern of rotatable shaft 12 can be determined from synchronous torque runout signal 32 in such an angle domain.

Figure 4:
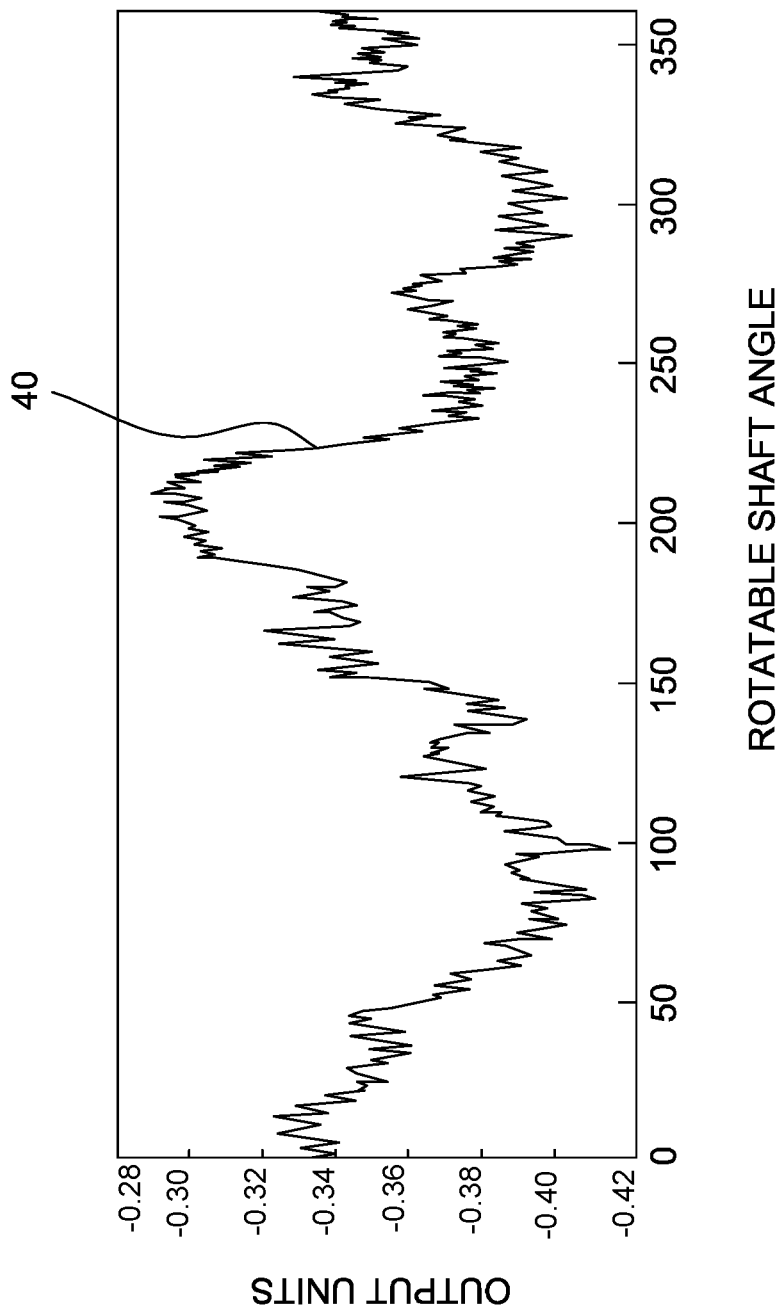
FIG. 4 is a schematic plot of an exemplary time-synchronous averaged runout pattern after averaging the synchronous torque runout signal shown in FIG. 3.

FIG. 4 is a schematic plot of exemplary time-synchronous averaged runout pattern 40 after averaging of synchronous torque runout signal 32 (shown in FIG. 3) by controller 24 (shown in FIG. 1). In the exemplary embodiment, noise and/or variance in synchronous torque runout signal 32 can be reduced or eliminated by averaging multiple revolutions of rotatable shaft 12 (shown in FIG. 1) using synchronous torque runout signal 32. As described above, in the exemplary embodiment, synchronous torque runout signal 32 corresponds to five revolutions of rotatable shaft 12. The signal data corresponding to each revolution can be combined with the signal data corresponding to each of the other revolutions and averaged to approximate the runout pattern of rotatable shaft 12. The approximated runout pattern of rotatable shaft 12 is illustrated by time-synchronous averaged runout pattern 40. In alternative embodiments, any number of revolutions of rotatable shaft 12 can be used in combination with synchronous torque runout signal 32 to determine time-synchronous averaged runout pattern 40.

Figure 5:
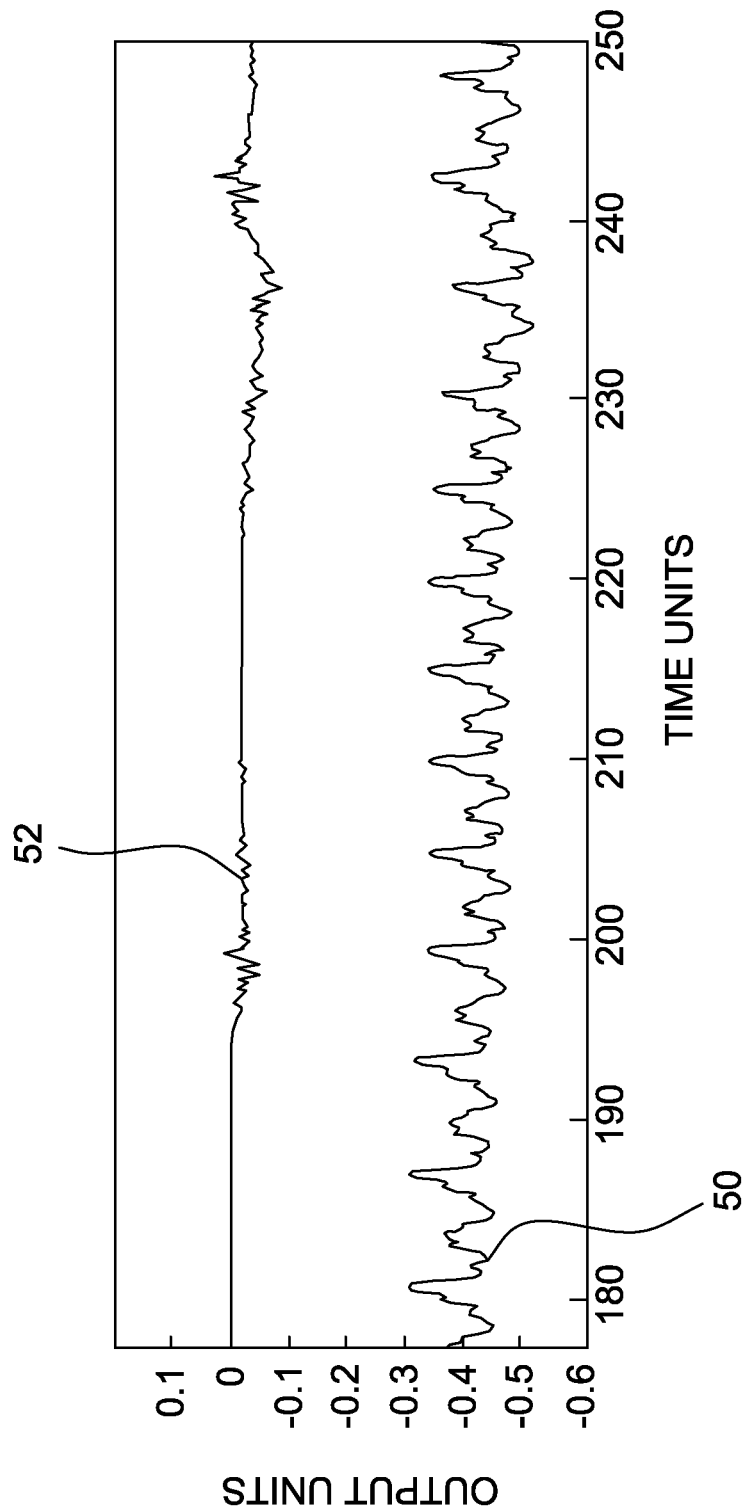
FIG. 5 is a schematic plot of a zero stress runout pattern waveform and a compensated torque signal waveform.

FIG. 5 is a schematic plot of a runout pattern waveform 50 and a compensated torque signal waveform 52. In the exemplary embodiment, time-synchronous averaged runout pattern 40 can be converted back into the time domain by controller 24 (shown in FIG. 1) to generate runout pattern waveform 50 and can be subtracted from torque signal 28 to generate compensated torque signal waveform 52. As shown in FIG. 5, revolution to revolution variance due to rotatable shaft 12 (shown in FIG. 1) runout is substantially eliminated when compensated torque signal waveform 52 is compared to torque signal 28 (shown in FIG. 2). In the exemplary embodiment, compensated torque signal waveform 52 is generated in real-time by controller 24. For example, in one embodiment, during startup or initial rotation of rotatable shaft 12, torque signal 28 under a zero stress condition can be received or collected by controller 24. In an alternative embodiment, controller 24 receives torque signal 28 from sensor heads 14 and 16 (shown in FIG. 1) continuously. In the exemplary embodiment, runout pattern waveform 50 can be determined and subsequently removed from torque signal 28 in real-time. Alternatively, in one embodiment, rotatable shaft 12 can be rotated under a zero stress condition and controller 24 may determine runout pattern waveform 50 and store it in memory for future use with torque signal 28, for example, at a future time when rotatable shaft 12 is rotating under a non-zero stress condition.

Figure 6:
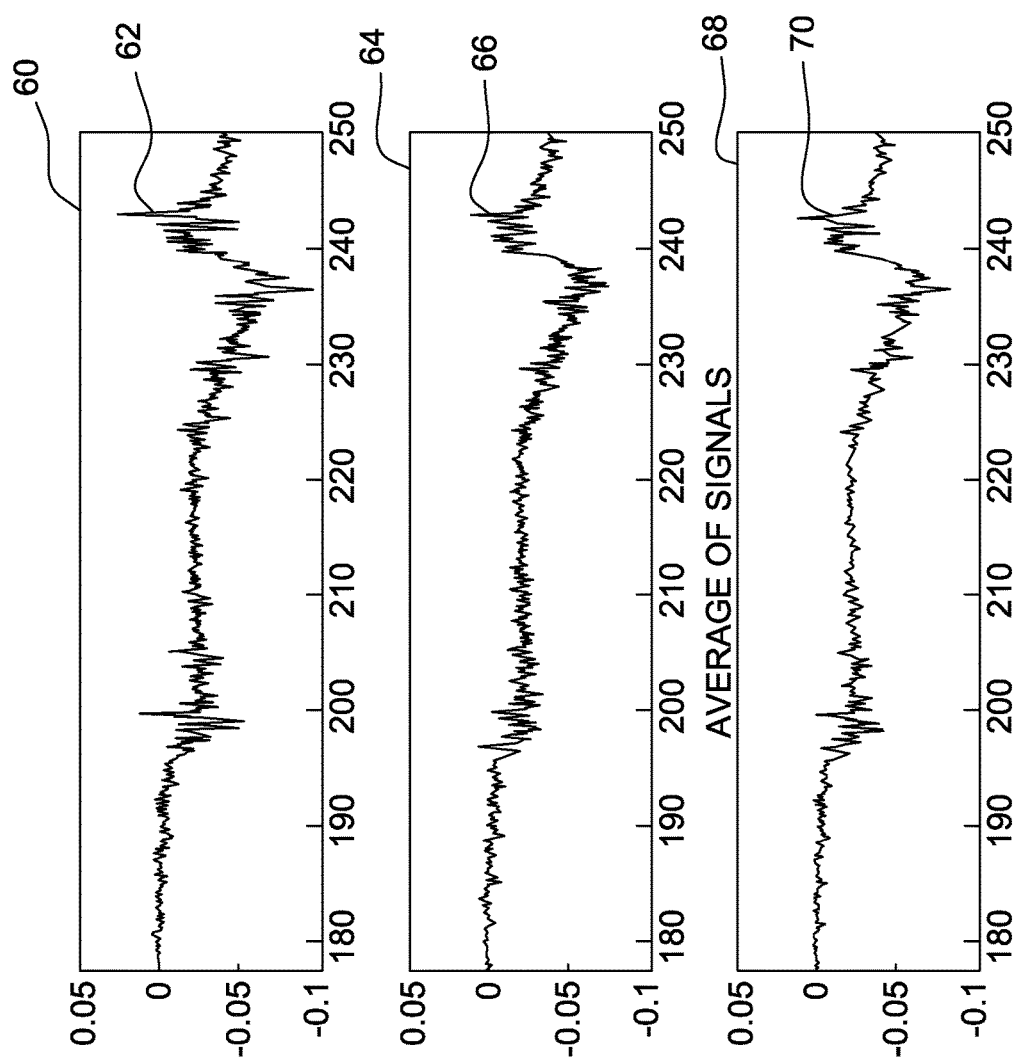
FIG. 6 is schematic of a first compensated torque signal waveform, a second compensated torque signal waveform, and an averaged compensated torque signal waveform.

FIG. 6 is schematic of a first plot 60 of a first compensated torque signal waveform 62, a second plot 64 of a second compensated torque signal waveform 66, and a third plot 68 of an averaged compensated torque signal waveform 70. In the exemplary embodiment, noise in first compensated torque signal waveform 62 and second compensated torque signal waveform 66 due to mechanical vibration of rotatable shaft 12 can be reduced or eliminated by averaging the torque signals of multiple sensor heads, such as sensor heads 14 and 16 (shown in FIG. 1). For example, as shown in FIG. 6, first compensated torque signal waveform 62 and second compensated torque signal waveform 66 each contain noise due in part to mechanical vibration of rotatable shaft 12. As such, while first compensated torque signal waveform 62 and second compensated torque signal waveform 66 are both measuring the stress in rotatable shaft 12, they are not providing the signals. In the exemplary embodiment, controller 24 (shown in FIG. 1) can combine first compensated torque signal waveform 62 and second compensated torque signal waveform 66 and determine averaged compensated torque signal waveform 70 by applying a conventional averaging technique. As such, averaged compensated torque signal waveform 70 provides a waveform indicative of the stress in rotatable shaft 12 with runout and mechanical vibration noise substantially decreased or eliminated from the waveform. This facilitates providing a torque measurement corresponding to rotatable shaft 12 having an increased accuracy. Furthermore, in instances where the runout and mechanical vibration noise may have greater amplitude than the torque data, averaged compensated torque signal waveform 70 facilitates discriminating the torque data from such runout and mechanical vibration noise.

Figure 7A:
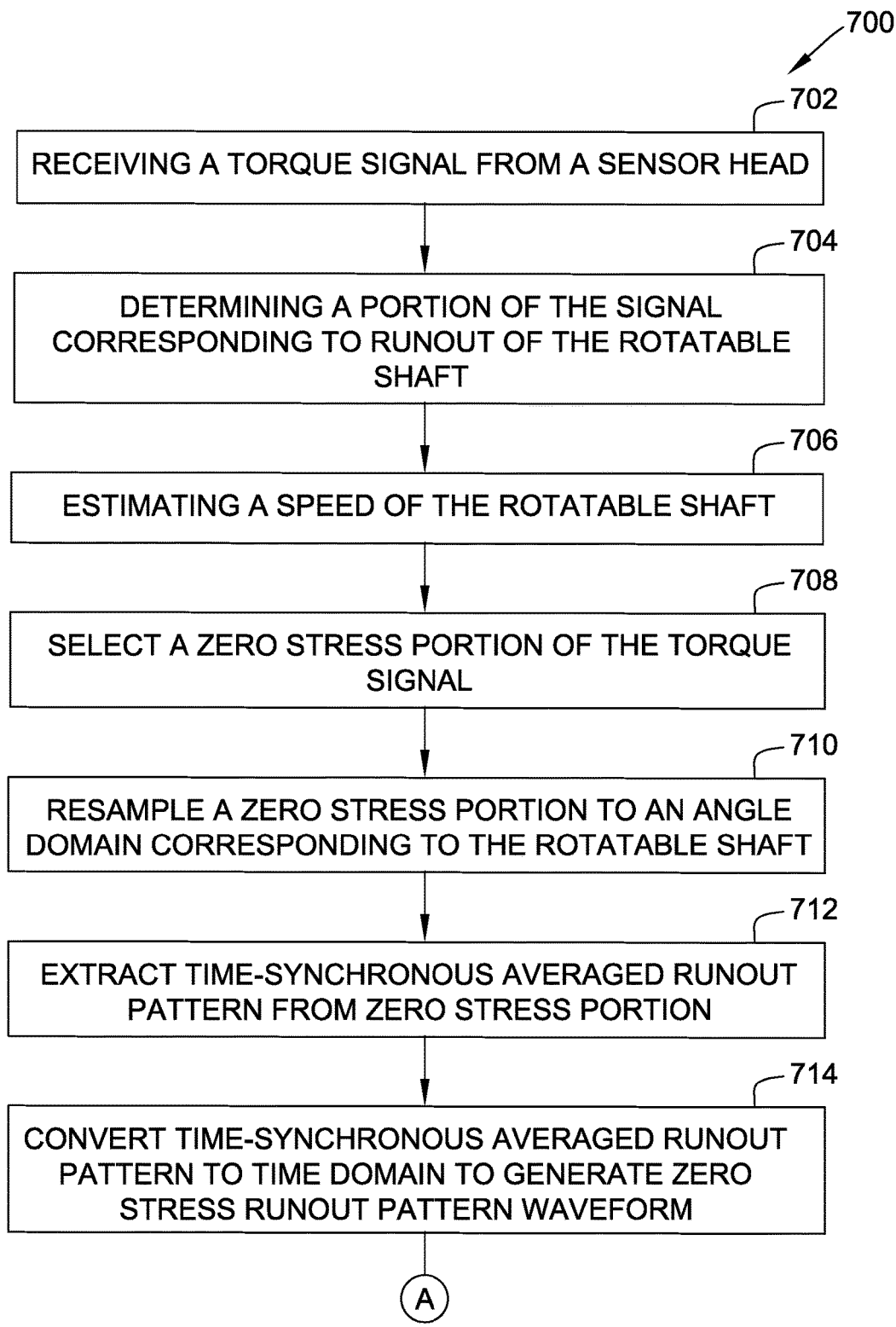
FIG. 7A is a is a block diagram of an exemplary method that facilitates reducing or eliminating signal noise due to runout and mechanical vibrations from the torque signal shown in FIG. 2.
Figure 7B:
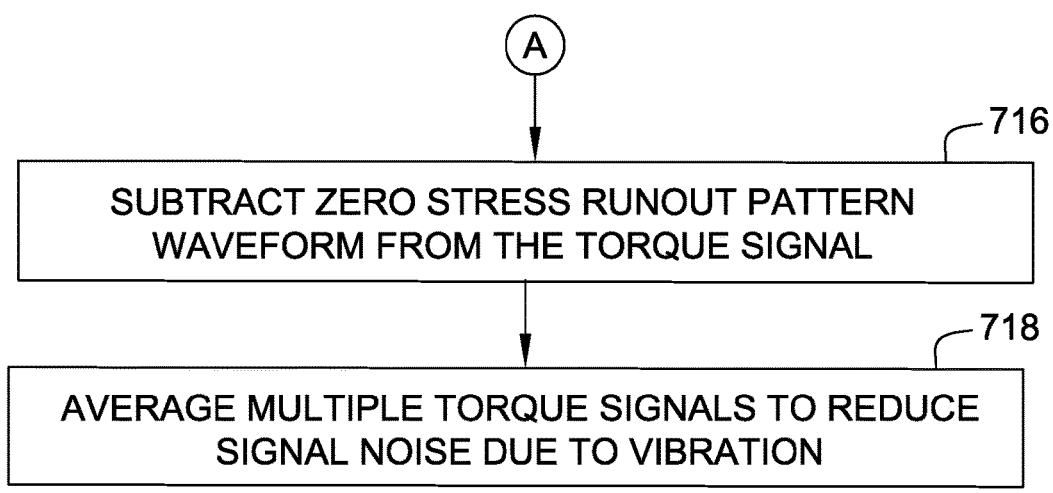
FIG. 7B is a continuation of the block diagram shown in FIG. 7A.

FIGS. 7A and 7B is a is a block diagram of an exemplary method 700 that facilitates reducing or eliminating signal noise due to runout and mechanical vibrations from torque signal 28 (shown in FIG. 2). In the exemplary embodiment, method 700 includes receiving 702 a torque signal 28 from one or more sensor heads 14 and 16 (shown in FIG. 1) of stress sensing system 10. A portion of the signal corresponding to runout of rotatable shaft 12 is determined 704. For example, determining the runout portion of signal 28 includes estimating 706 a speed of rotatable shaft 12 by finding threshold crossings or spikes in a rotation signal (not shown) received by controller 24 (shown in FIG. 1). An angular position of rotatable shaft 12 can be estimated by applying linear interpolation to a period between adjacent threshold crossings or spikes in a rotation signal. In one embodiment, a zero stress portion of torque signal 28 (torque signal portion 30 shown in FIG. 2) is selected 708. In another embodiment, any portion of torque signal 28 may be selected by controller 24. In the exemplary embodiment, torque signal portion 30 is resampled 710 to an angle domain corresponding to rotatable shaft 12. Time-synchronous averaged runout pattern 40 is extracted 712 from torque signal portion 30. In some embodiments, the time-synchronous averaged runout pattern 40 is generated by averaging multiple portions of torque signal portion 30 corresponding to a single rotation of rotatable shaft 12 together. Time-synchronous averaged runout pattern 40 is converted 714 to the time domain to generate runout pattern waveform 50. In some embodiments, time-synchronous averaged runout pattern 40 is converted to the frequency domain. In the exemplary embodiment, runout pattern waveform 50 is subtracted 716 from torque signal 28 to generate compensated torque signal waveform 52, which is substantially free of noise related to the runout of rotatable shaft 12. In embodiments with more than one sensor head, such as sensor heads 14 and 16 (shown in FIG. 1), signals from the multiple sensor heads are averaged 718 together to facilitate reducing noise related, at least in part, to mechanical vibrations of rotatable shaft 12.

Figure 8:
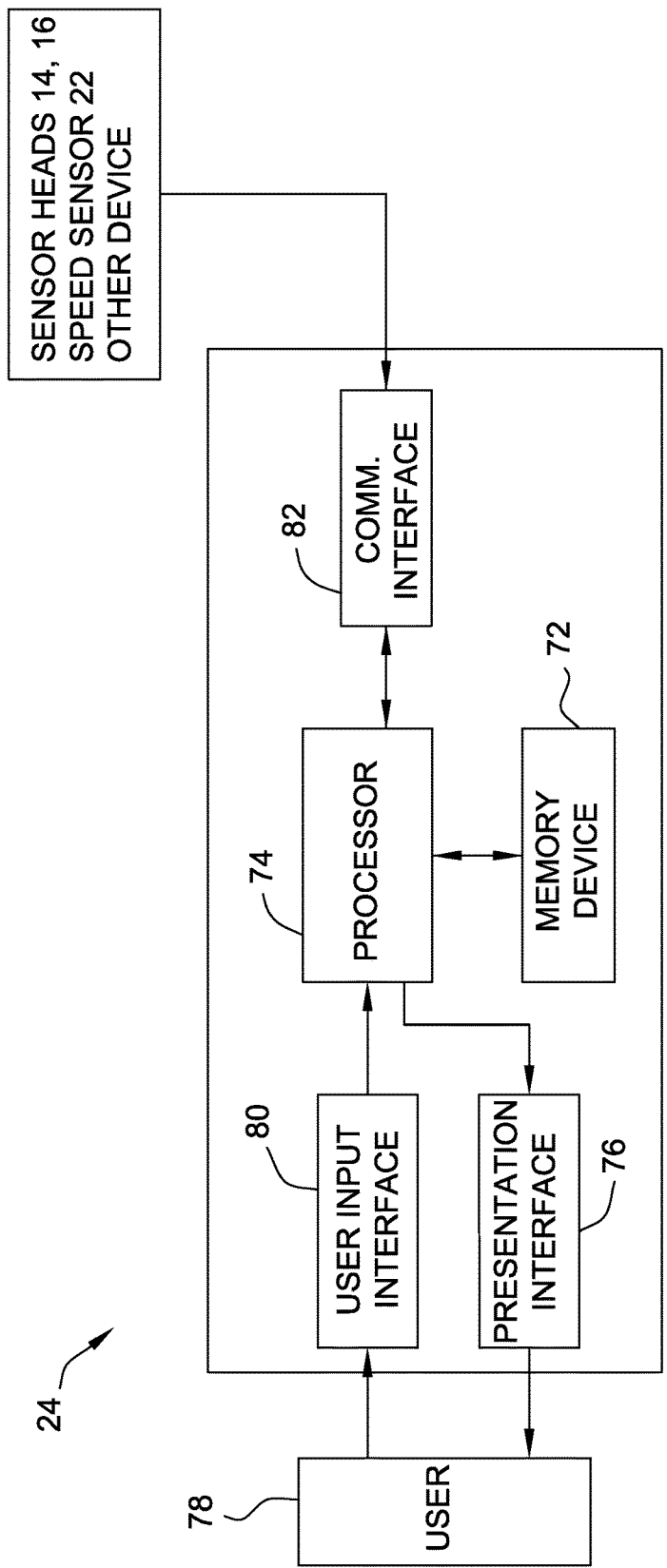
FIG. 8 is a block diagram of the controller of the stress sensing system shown in FIG. 1.

FIG. 8 is a block diagram of controller 24 that can be used to operate stress sensing system 10 (shown in FIG. 1). In the exemplary embodiment, controller 24 can be one of any type of controller typically provided by a manufacturer of stress sensing system 10 to control operation of stress sensing system 10. Controller 24 may execute operations to control the operation of stress sensing system 10 based at least partially on instructions from human operators. Operations executed by controller 24 typically include controlling power output of sensor heads 14 and 16 (shown in FIG. 1), and speed sensor 22 (shown in FIG. 1), and receiving torque signals from the sensor heads, such a torque signal 28 (shown in FIG. 2). Controller 24 may also perform the various operations described herein to facilitate determining averaged compensated torque signal waveform 70 (shown in FIG. 6).

In the exemplary embodiment, controller 24 typically includes a memory device 72 and a processor 74 coupled to memory device 72. Processor 74 may include one or more processing units, such as, without limitation, a multi-core configuration. Processor 74 can be any type of processor that permits controller 24 to function as described herein. In some embodiments, executable instructions can be stored in memory device 72. Controller 24 can be configurable to perform one or more operations described herein by programming processor 74. For example, processor 74 may be programmed by encoding an operation as one or more executable instructions and providing the executable instructions in memory device 72. In the exemplary embodiment, memory device 72 can be one or more devices that enable storage and retrieval of information such as executable instructions or other data. Memory device 72 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 72 may be configured to store any type of data, including, without limitation, torque signal 28 and runout pattern waveform 50. In some embodiments, processor 74 can remove or "purge" data from memory device 72 based on the age of the data. For example, processor 74 may overwrite previously recorded and stored data, such as runout pattern waveform 50, associated with a subsequent time or event. In addition, or alternatively, processor 74 may remove data that exceeds a predetermined time interval. In addition, memory device 72 can include, without limitation, sufficient data, algorithms, and commands to facilitate monitoring of sensor heads 14 and 16, and in particular, torque signals 28 being generated by stress sensing system 10.

In some embodiments, controller 24 includes a presentation interface 76 coupled to processor 74. Presentation interface 76 can present information, such as, and without limitation, runout pattern waveform 50, compensated torque signal waveform 52, averaged compensated torque signal waveform 70, and operating conditions of stress sensing system 10, to a user 78. In one embodiment, presentation interface 76 can include a display adapter (not shown) coupled to a presentation device (not shown). The presentation device can include such devices as a cathode ray tube (CRT), a liquid crystal display (LCD), an organic LED (OLED) display, or an "electronic ink" display. In some embodiments, presentation interface 76 can include one or more presentation devices. In addition, or alternatively, presentation interface 76 can include an audio output device (not shown), for example, without limitation, an audio adapter or a speaker (not shown).

In some embodiments, controller 24 can include a user input interface 80. In the exemplary embodiment, user input interface 80 can be coupled to processor 74 and can receive input from user 78. User input interface 80 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a presentation device of presentation interface 76 and user input interface 80.

In the exemplary embodiment, a communication interface 82 can be coupled to processor 74 and can be configured to be coupled in communication with one or more other devices, such as sensor heads 14 and 16, and to perform input and output operations with respect to such devices while performing as an input channel. For example, communication interface 82 may include, without limitation, a wired network adapter, a wireless network adapter, a mobile telecommunications adapter, a serial communication adapter, or a parallel communication adapter. Communication interface 82 may receive a data signal from or transmit a data signal to one or more remote devices. For example, in some embodiments, communication interface 82 of controller 24 may transmit/receive a data signal to/from sensor heads 14 and 16, or speed sensor 22.

Presentation interface 76 and communication interface 82 can be capable of providing information suitable for use with the methods described herein, such as, providing information to user 78 or processor 74. Accordingly, presentation interface 76 and communication interface 82 may be referred to as output devices. Similarly, user input interface 80 and communication interface 82 can be capable of receiving information suitable for use with the methods described herein and may be referred to as input devices.

In contrast to known stress sensing systems, the stress sensing systems and methods described herein may be used to identify and reduce or eliminate signal noise attributed to runout and/or mechanical vibration of a conductive target material from a torque signal received from a torque sensor. Specifically, the stress sensing systems and methods described herein can help measure an output, such as a voltage, from each of the sensor heads when the conductive target material is under a zero stress condition, and determine a runout pattern of the conductive target material from the measured output signal. The runout pattern can be averaged across several revolutions of the conductive target material to facilitate reducing noise in the signal, and can then be subtracted from the original signal to substantially remove the runout noise from the torque signal. The torque signals from several torque sensors can be averaged to facilitate reducing or removing noise attributed to mechanical vibration of the conductive target material. Therefore, in contrast to known stress sensing systems, the stress sensing systems and methods described may be used to provide a torque measurement corresponding to the conductive target material having an increased accuracy. Furthermore, in instances where the runout and mechanical vibration noise may have greater amplitude than the torque signal, the stress sensing systems and methods described herein may be used to discriminate the torque data from such runout and mechanical vibration noise.

An exemplary technical effect of the systems and methods described herein includes at least one of (a) determining runout and mechanical vibration noise in a torque signal; (b) identifying the runout pattern in the torque signal; (c) removing to reducing the effects of the runout pattern on the torque signals; and (d) removing or reducing the effects of mechanical vibration of a conductive target material from the torque signal.

While the disclosure has been described in detail in connection with only a limited number of embodiments, it should be readily understood that the disclosure is not limited to such disclosed embodiments. Rather, the disclosure can be modified to incorporate any number of variations, alterations, substitutions, or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A stress sensing system for measuring stress in a conductive target material, said stress sensing system comprising:
   at least one sensor positioned proximate to the conductive target material, said at least one sensor configured to measure stress in the conductive target material and to transmit at least one signal indicative of the measured stress;
   a speed sensor configured to detect a rotation of the conductive target material; and
   at least one controller coupled in communication with said at least one sensor, said at least one controller configured to:
   receive the at least one signal from said at least one sensor;
   select a zero stress portion of the at least one signal corresponding to a zero stress condition of the conductive target material;
   resample the zero stress portion to an angle domain corresponding to the conductive target material;
   extract a sample portion of the zero stress portion to define a time-synchronous runout pattern of the at least one signal, the sample portion including a first portion of the zero stress portion corresponding to a single rotation of the conductive target material, wherein the sample portion of the zero stress portion comprises a first portion and a second portion of the zero stress portion, the first and second portions of the zero stress portion corresponding to a first and a second rotation of the conductive target material, respectively;
   receive rotation signal characterizing the detected rotation of the conductive target material;
   determine a runout portion of the at least one signal corresponding to runout of the conductive target material based on the rotation signal;
   determine a runout pattern waveform from the runout portion, the determination includes averaging the first and second portions of the zero stress portion;
   generate a compensated torque signal waveform by subtracting the runout pattern waveform from the at least one signal; and
   provide the compensated torque signal waveform.

2. A stress sensing system in accordance with claim 1, wherein said at least one controller configured to determine a runout portion of the at least one signal further comprises said at least one controller configured to estimate a rotational speed of the conductive target material based on the rotation signal.

3. A stress sensing system in accordance with claim 1, wherein said at least one sensor comprises a first sensor and a second sensor, and the at least one signal includes a first signal and a second signal, respectively, said at least one controller further configured to average the first and second signals together to reduce signal noise attributed to mechanical vibration.

4. A computer-implemented method for reducing runout and vibration noise from a stress sensing system, said method comprising:
receiving at least one signal from at least one stress sensor, the at least one signal indicative of stress in a conductive target material;
receiving rotation signal characterizing a detected rotation of the conductive target material;
selecting a zero stress portion of the at least one signal corresponding to a zero stress condition of the conductive target material;
resampling the zero stress portion to an angle domain corresponding to the conductive target material;
extracting a sample portion of the zero stress portion to define a time-synchronous runout pattern of the at least one signal, the sample portion including a first portion of the zero stress portion corresponding to a single rotation of the conductive target material, wherein the sample portion of the zero stress portion comprises a first portion and a second portion of the zero stress portion, the first and second portions of the zero stress portion corresponding to a first and a second rotation of the conductive target material, respectively;
determining a runout portion of the at least one signal that corresponds to runout of the conductive target material based on the rotation signal;
determining a runout pattern waveform from the runout portion of the at least one signal, the determining includes averaging the first and second portions of the zero stress portion;
generating a compensated torque signal waveform by subtracting the runout pattern waveform from the at least one signal; and
providing the compensated torque signal waveform.

5. A computer-implemented method in accordance with claim 4 further comprising rotating the conductive target material comprising:
rotating the conductive target material under a zero stress condition, in which the conductive target material is not subject to an external stress; and
applying an external stress to the conductive target material such that the conductive target material is rotating under a non-zero stress condition.

6. A computer-implemented method in accordance with claim 5, wherein receiving at least one signal comprises receiving the at least one signal under the zero stress condition and the non-zero stress condition.

7. A computer-implemented method in accordance with claim 4 further comprising estimating a rotational speed of the conductive target material.

8. A computer-implemented method in accordance with claim 4, wherein determining a runout pattern waveform further comprises converting the time-synchronous runout pattern of the at least one signal to the time domain.

9. A computer-implemented method in accordance with claim 4, wherein receiving at least one signal from at least one stress sensor comprises receiving a first signal from a first stress sensor and receiving a second signal from a second stress sensor, said method further comprising averaging the first and second signals together to reduce signal noise attributable to mechanical vibration of the conductive target material.

10. A non-transitory computer readable medium that includes computer executable instructions for reducing runout and vibration noise from a stress sensing system, the stress sensing system including a computing device, wherein when executed by the computing device, the computer executable instructions cause the computing device to:
receive at least one signal from at least one stress sensor, the at least one signal indicative of stress in a conductive target material;
select a zero stress portion of the at least one signal corresponding to a zero stress condition of the conductive target material;
resample the zero stress portion to an angle domain corresponding to the conductive target material;
extract a sample portion of the zero stress portion to define a time-synchronous runout pattern of the at least one signal, the sample portion including a first portion of the zero stress portion corresponding to a single rotation of the conductive target material, wherein the sample portion of the zero stress portion comprises a first portion and a second portion of the zero stress portion, the first and second portions of the zero stress portion corresponding to a first and a second rotation of the conductive target material, respectively;
receive rotation signal characterizing a detected rotation of the conductive target material;
determine a runout portion of the at least one signal that corresponds to runout of the conductive target material based on the rotation signal;
determine a runout pattern waveform from the runout portion of the at least one signal, the determination includes averaging the first and second portions of the zero stress portion;
generate a compensated torque signal waveform by subtracting the runout pattern waveform from the at least one signal; and
provide the compensated torque signal waveform.

11. A non-transitory computer readable medium in accordance with claim 10, wherein the computer executable instructions further cause the computing device to estimate a rotational speed of the conductive target material.

12. A stress sensing system for measuring stress in a conductive target material, said stress sensing system comprising:
at least one sensor positioned proximate to the conductive target material, said at least one sensor configured to measure stress in the conductive target material and to transmit at least one signal indicative of the measured stress; and
at least one controller coupled in communication with said at least one sensor, said at least one controller configured to:
receive the at least one signal from said at least one sensor;
select a zero stress portion of the at least one signal corresponding to a zero stress condition of the conductive target material;
resample the zero stress portion to an angle domain corresponding to the conductive target material;
extract a sample portion of the zero stress portion to define a time-synchronous runout pattern of the at least one signal, the sample portion including a first portion of the zero stress portion corresponding to a single rotation of the conductive target material, wherein the sample portion of the zero stress portion comprises a first portion and a second portion of the zero stress portion, the first and second portions of the zero stress portion corresponding to a first and a second rotation of the conductive target material, respectively;
receive a second signal indicative of a rotation of the conductive target material;
determine a runout portion of the at least one signal corresponding to runout of the conductive target material based on the second signal;
determine a runout pattern waveform from the runout portion, the determination includes averaging the first and second portions of the zero stress portion;
generate a compensated torque signal waveform by subtracting the runout pattern waveform from the at least one signal; and
provide the compensated torque signal waveform.

\* \* \* \* \*